United States Patent
Fujinawa et al.

(10) Patent No.: US 7,033,855 B2
(45) Date of Patent: Apr. 25, 2006

(54) OPTICAL COMPONENT AND METHOD OF MANUFACTURING THE SAME

(75) Inventors: Jun Fujinawa, Kanagawa (JP); Junji Nakada, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/981,601

(22) Filed: Nov. 5, 2004

(65) Prior Publication Data

US 2005/0064642 A1    Mar. 24, 2005

Related U.S. Application Data

(62) Division of application No. 10/252,390, filed on Sep. 24, 2002, now Pat. No. 6,833,600.

(30) Foreign Application Priority Data

| Sep. 25, 2001 | (JP) | ............................ 2001-290990 |
| Sep. 25, 2001 | (JP) | ............................ 2001-290991 |
| Sep. 25, 2001 | (JP) | ............................ 2001-291271 |
| Sep. 25, 2001 | (JP) | ............................ 2001-291467 |

(51) Int. Cl.
*H01L 21/00*    (2006.01)

(52) U.S. Cl. .................. 438/48; 359/586; 264/171.1; 156/273.7; 438/200; 257/200

(58) Field of Classification Search ............... 359/586; 264/171.1; 156/273.7; 438/200; 257/200
See application file for complete search history.

(56) References Cited

U.S. PATENT DOCUMENTS

| 5,789,476 | A | 8/1998 | Iryo et al. |
| 6,340,404 | B1 | 1/2002 | Oka et al. |
| 6,379,803 | B1 | 4/2002 | Nakamura et al. |
| 6,686,049 | B1 | 2/2004 | Nakamura et al. |
| 2002/0051295 | A1 * | 5/2002 | Oka et al. |

* cited by examiner

*Primary Examiner*—Mai-Huong Tran
(74) *Attorney, Agent, or Firm*—Sughrue Mion, PLLC

(57) ABSTRACT

The optical component includes a substrate made of a resin material, a silicon oxide film formed on a surface of the substrate, and a multilayer light reflection preventing film formed on the silicon oxide film, and having at least one layer of a low-refractive-index material and at least one layer of a high-refractive-index material being alternately formed. The silicon oxide film is thick and/or formed by introducing oxygen during film forming by vacuum deposition so that a preset elasticity is imparted to the silicon oxide film. Other optical component includes a substrate made of a resin material and a plurality of films formed by vacuum deposition, and directions of internal stresses in each adjacent pair of the plurality of films are different from each other or a thickness of an impurity existing on a surface of the substrate is 0.2 nm or less. The plurality of films are formed by performing melting of film forming materials other than a film forming material for a film formed on the surface of the substrate after the film is formed on the surface of the substrate.

3 Claims, 3 Drawing Sheets

OPTICAL COMPONENT AND METHOD OF MANUFACTURING THE SAME

This is a divisional of application Ser. No. 10/252,390 filed Sep. 24, 2002 now U.S. Pat. No. 6,833,600.

BACKGROUND OF THE INVENTION

The present invention belongs to a technical field covering optical components such as lenses. More particularly, the present invention relates to a durable optical component having a multilayer light reflection preventing film or the like having high adhesion force, and to a method of manufacturing the optical component.

Glass has been used as a material for optical components such as lenses. On the other hand, in recent years, optical components made of plastics such as polymethyl methacrylate (PMMA), etc. have been found in wide use because they are light in weight, low-cost and highly producible.

One of characteristics generally required for such optical components is a good light reflection preventing property (low optical reflectivity). Ordinarily, a light reflection preventing film is formed on a surface of such optical components.

A single-layer film formed by using a low-refractive-index material such as magnesium fluoride ($MgF_2$) is generally used as a light reflection preventing film formed on optical component surfaces. As a light reflection preventing film with better light reflection preventing property, a multilayer light reflection preventing film (multiple coating light reflection preventing film) is known in which a single layer or multiple layers of a low-refractive-index material and a single layer or multiple layers of a high-refractive-index material are alternately formed.

Optical components made of plastics having a multilayer light reflection preventing film, however, have a problem that adhesion property between a substrate (i.e., the optical component made of a plastic) and the multilayer light reflection preventing film is low, that is, the durability is not sufficiently high.

Ordinarily, a multilayer light reflection preventing film is formed by a vapor-phase deposition process such as vacuum deposition.

In a vapor-phase deposition process, the temperature of the substrate rises to expand the substrate even though heating of the substrate is not performed. In particular, to form a multilayer light reflection preventing film, a process in which a plurality of layers are successively formed and film forming of a high-refractive-index material is performed by using a comparatively large amount of energy is ordinarily performed in consideration of productivity, etc. If such process is used, the substrate temperature becomes so high that the substrate expands substantially largely.

When the substrate is taken out of the film forming apparatus into atmosphere after film forming of a multilayer light reflection preventing film has been completed, it is abruptly cooled to shrink.

However, the substrate made of a plastic, particularly an acrylic material typified by PMMA and the multilayer light reflection preventing film formed on the substrate differ in thermal expansion coefficient from each other, and the thermal expansion coefficient of the multilayer light reflection preventing film formed on the substrate is smaller than that of the substrate. Therefore, the multilayer light reflection preventing film cannot follow the deformation of the substrate due to its shrinkage when the substrate is taken out of the film forming apparatus into atmosphere after the completion of film forming, resulting in damage to the multilayer light reflection preventing film and large strain in the film.

As a result, the adhesion force of the multilayer light reflection preventing film is reduced. Also, the adhesion force gradually reduces with time. Thus, the durability of the optical component having the multilayer light reflection preventing film is substantially reduced.

SUMMARY OF THE INVENTION

A first object of the present invention is to provide an optical component and a manufacturing method thereof free from the above-described problem of the conventional art, i.e., an optical component in which a multilayer light reflection preventing film is formed on a substrate made of a plastic which is light in weight, low-cost, and highly producible, in which the adhesion force of the film is high, and which has improved durability as well as a good light reflection preventing property, and a method of manufacturing the optical component.

A second object of the present invention is to provide an optical component and a manufacturing method free from the above-described problem of the conventional art, i.e., an optical component in which a substrate made of a plastic which is light in weight, low-cost, and highly producible is used, in which a plurality of films for a multilayer light reflection preventing film or the like are formed on the substrate by vacuum deposition, in which the adhesion force of the film is high, and which has improved durability, and a method of manufacturing the optical component.

In order to attain the first object described above, the first aspect of the present invention provides an optical component comprising a substrate made of a resin material, a thick silicon oxide film formed on a surface of the substrate, and a multilayer light reflection preventing film formed on the thick silicon oxide film, and having at least one layer of a low-refractive-index material and at least one layer of a high-refractive-index material being alternately formed.

Preferably, the substrate is made of an acrylic resin material.

Preferably, the thick silicon oxide film is formed by introducing oxygen during film forming by vacuum deposition so that a preset elasticity is imparted to the thick silicon oxide film.

Preferably, directions of internal stresses in each adjacent pair of the thick silicon oxide film and the respective layers constituting the multilayer light reflection preventing film are different from each other.

Preferably, a thickness of an impurity existing on the surface of the substrate is 0.2 nm or less.

And, preferably, the multilayer light reflection preventing film is formed by vacuum deposition in such a manner that the thick silicon oxide film is formed by vacuum deposition on the surface of the substrate, and thereafter, melting of a low-refractive-index material and a high-refractive-index material provided as film forming materials for the multilayer light reflection preventing film is performed.

Also, in order to attain the first object described above, the second aspect of the present invention provides an optical component comprising a substrate made of a resin material, a silicon oxide film formed on a surface of the substrate, and a multilayer light reflection preventing film formed on the silicon oxide film, and having at least one layer of a low-refractive-index material and at least one layer of a high-refractive-index material being alternately formed, wherein a preset elasticity is imparted to the silicon oxide film by introducing oxygen during film forming by vacuum deposition.

In addition, the second aspect of the present invention provides a method of manufacturing an optical component which comprises a substrate made of a resin material, a silicon oxide film formed on a surface of the substrate, and a multilayer light reflection preventing film formed on the silicon oxide film, and having at least one layer of a low-refractive-index material and at least one layer of a high-refractive-index material being alternately formed, comprising forming the silicon oxide film by vacuum deposition, and introducing oxygen during film forming of the silicon oxide film by vacuum deposition to impart a preset elasticity to the silicon oxide film.

Preferably, the substrate is made of an acrylic resin material.

Preferably, directions of internal stresses in each adjacent pair of the silicon oxide film and the respective layers constituting the multilayer light reflection preventing film are different from each other.

Preferably, a thickness of an impurity existing on the surface of the substrate is 0.2 nm or less.

Further, preferably, the multilayer light reflection preventing film is formed by vacuum deposition in such a manner that the silicon oxide film is formed by vacuum deposition on the surface of the substrate, and thereafter, melting of a low-refractive-index material and a high-refractive-index material provided as film forming materials for the multilayer light reflection preventing film is performed.

In order to attain the second object described above, the third aspect of the present invention provides an optical component comprising a substrate made of a resin material, and a plurality of films formed by vacuum deposition, wherein directions of internal stresses in each adjacent pair of the plurality of films are different from each other.

Preferably, a thickness of an impurity existing on a surface of the substrate is 0.2 nm or less.

Preferably, the plurality of films are formed in such a manner that after one film of the plurality of films has been formed on a surface of the substrate, melting of film forming materials other than a film forming material for one film formed on the surface of the substrate is performed.

Furthermore, in order to attain the second object described above, the fourth aspect of the present invention provides an optical component comprising a substrate made of a resin material, and a plurality of films formed by vacuum deposition, wherein a thickness of an impurity existing on a surface of the substrate is 0.2 nm or less.

Preferably, the plurality of films are formed in such a manner that after one film of the plurality of films has been formed on the surface of the substrate, melting of film forming materials other than a film forming material for one film formed on the surface of the substrate is performed.

Further, the fourth aspect of the present invention provides an method of manufacturing an optical component in which a plurality of films are formed by vacuum deposition on a surface of a substrate made of a resin material, the method comprising forming one film of the plurality of films on the surface of the substrate, and performing melting of film forming materials other than a film forming material for one film formed on the surface of the substrate after film forming of one film of the plurality of films on the surface of the substrate.

DESCRIPTION OF THE PREFERRED EMBODIMENTS

Preferred embodiments of an optical component and a method of manufacturing the optical component according to the present invention will be described in detail with reference to the accompanying drawings.

Figure 1:
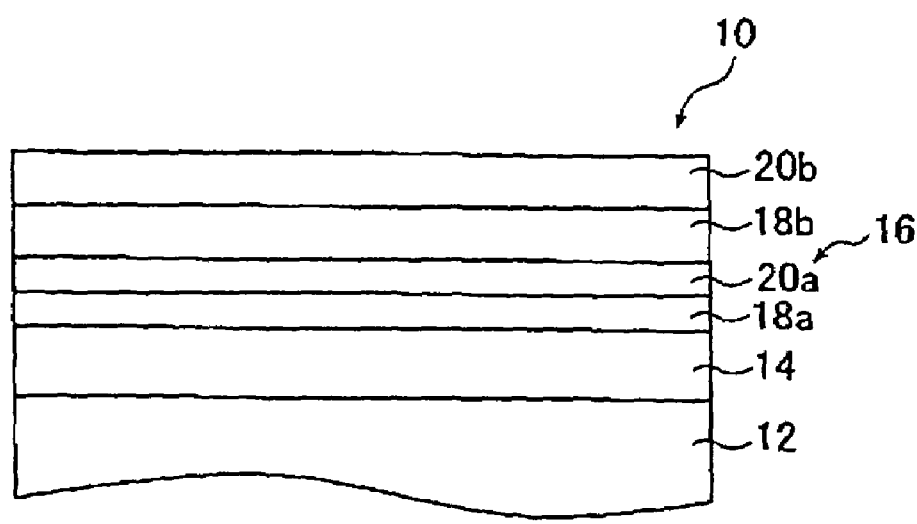
FIG. 1 is a diagram schematically showing an embodiment of an optical component in accordance with the present invention.

FIG. 1 shows the concept of the layer structure of an embodiment of optical components in first to fourth aspects of the present invention.

An optical component 10 in accordance with the present invention is constituted by an optical component main body 12 used as a base member (hereinafter referred to as "substrate"), a silicon oxide film 14 formed on a surface of the substrate 12, and a multilayer light reflection preventing film 16 (hereinafter referred to as light reflection preventing film 16) formed on silicon oxide film 14. In the illustrated embodiment, the light reflection preventing film 16 has a four-layer structure in which two high-refractive-index layers 18 (18a and 18b) formed of a high-refractive-index material and two low-refractive-index layers 20 (20a and 20b) formed of a low-refractive-index material are alternately superposed one on another.

The optical components and the methods of manufacturing the optical components in the first and second aspects of the present invention will be described.

The optical component in the first aspect of the present invention described below with reference to the optical component 10 having the layer structure shown in FIG. 1 is characterized by having silicon oxide film 14 having a large film thickness. The optical component in the second aspect of the present invention also described below with reference to the optical component 10 is characterized in that oxygen is introduced at the time of film forming of silicon oxide film 14 by vacuum deposition to form a porous film having predetermined elasticity. Before describing characteristic details of each of the optical components in the first and second aspects of the present invention, a common description of identical details of the optical components will first be made.

In the first and second aspects of the present invention, substrate 12 is formed from a resin material, preferably an acrylic resin material. In particular, substrate 12 made of polymethyl methacrylate (PMMA) is preferably used.

Except for this, there is no restriction on the selection of substrate 12 (i.e., the main body (kind) of optical component 10 in the present invention). Base substrate 12 can be selected from various known optical components, e.g., various lenses, various filters, various screens, polymer films, and optical substrates.

Silicon oxide film 14 is formed on a surface of substrate 12 of optical component 10 in each aspect of the present invention.

In optical component 10, silicon oxide film 14 acts as an adhesion layer for improving adhesion force between substrate 12 and light reflection preventing film 16.

In the first aspect of the present invention, this silicon oxide film 14 is preferably a film formed by vacuum deposition using silicon monoxide (SiO) as a film forming material (evaporation source). Preferably, during film forming of this silicon oxide film 14 by vacuum deposition, oxygen is introduced into the film forming system to impart elasticity to the film.

In the second aspect of the present invention, this silicon oxide film 14 is a film formed by vacuum deposition using silicon monoxide (SiO) as a film forming material (evaporation source). Also, during film forming of this silicon oxide film 14, oxygen is introduced into the film forming system to impart elasticity to the film. In other respects, film forming of silicon oxide film 14 may be performed in the same manner as ordinary vacuum deposition.

As described above, when a multilayer light reflection preventing film is formed on a substrate made of a plastic, particularly an acrylic material such as PMMA, the multilayer light reflection preventing film cannot follow, essentially due to the difference between the thermal expansion coefficients of the film and the substrate, a large amount of shrinkage/deformation of the substrate caused by cooling when the substrate is exposed to atmosphere after film forming, resulting in damage to the multilayer light reflection preventing film and large strain in the film. This problem is unavoidable with optical components made of plastics and having a film formed thereon by vacuum deposition. In the case of forming a multilayer light reflection preventing film, the problem is more serious since a plurality of films are successively formed.

As a result, the adhesion force of the multilayer light reflection preventing film is reduced. Also, the adhesion force gradually reduces with time. Thus, conventional optical components having a multilayer light reflection preventing film do not have suitable characteristics according to requirements in terms of durability.

In contrast, as optical component 10 in accordance with the present invention, silicon oxide film 14 which functions as an adhesion layer is provided in the first and second aspects of the present invention, and the film thickness of silicon oxide film 14 is increased in the first and second aspects of the present invention. Silicon oxide film 14 is thus formed to ensure sufficiently strong adhesion force between light reflection preventing film 16 and substrate 12, thereby realizing optical component 10 having improved durability.

The silicon oxide film formed by vacuum deposition using SiO as a film forming material has an improved adhesion property to a plastic, particularly PMMA. Also, this silicon oxide film is basically low in hardness and can be made porous by introducing oxygen into the film forming system during film forming by vacuum deposition. It is possible to impart elasticity for flexibility, e.g., a desired elasticity, to the silicon oxide film in accordance with the amount of oxygen introduced. It is also possible to reduce stress in silicon oxide film 14 (internal stress of thin film) by introducing oxygen during film forming.

Oxide film 14 having elasticity is provided in this manner to absorb large deformation of substrate 12, i.e., expansion during film forming of light reflection preventing film 16 and shrinkage caused by cooling after film forming, to prevent light reflection preventing film 16 from being damaged and strained by such deformation. Since stress in silicon oxide film 14 can be reduced, strain basically existing in the film itself is small.

Therefore, according to the first and second aspects of the present invention, in optical component 10 having a (multilayer) light reflection preventing film 16 formed on a substrate made of, for example, PMMA or the like, a reduction in adhesion force due to damage to light reflection preventing film 16 or strain in this film caused by deformation of substrate 12 during film forming can be prevented, thus realizing optical component 10 which has light reflection preventing film 16 having a strong adhesion force, and which has improved durability.

In the first aspect of the present invention, according to a study made by the inventors of the present invention, the effect to improve adhesion force of silicon oxide film 14 is not sufficient when the film thickness of silicon oxide film 14 is small, and a substantially large thickness is required for strong adhesion force. If the thickness of silicon oxide film 14 is larger, stronger adhesion force can be achieved.

Figure 2:
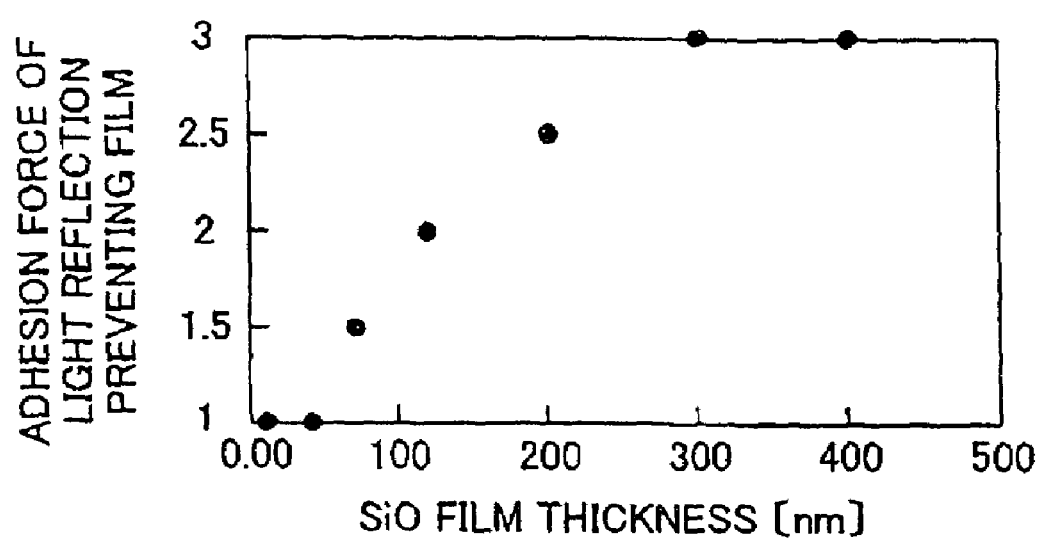
FIG. 2 is a graph showing the relationship between the film thickness of silicon dioxide film and the adhesion force of light reflection preventing film for explanation of optical components in accordance with the present invention.

FIG. 2 shows results of film forming in the first aspect of the present invention, i.e., the adhesion force of light reflection preventing film 16 with respect to different film thicknesses of silicon oxide film in optical components each of which has substrate 12, silicon oxide film formed on a surface of substrate 12 for an adhesion layer by using SiO as a film forming material, and light reflection preventing film 16 formed on the silicon oxide film, and each of which is thus constructed in the same manner as the optical component shown in FIG. 1.

Light reflection preventing film 16 has a multilayer structure formed by four layers: a high-refractive-index layer 18a having a thickness of 20 nm, a low-refractive-index layer 20a having a thickness of 30 nm, a high-refractive-index layer 18b having a thickness of 100 nm, and a low-refractive-index layer 20b having a thickness of 90 nm. Each high-refractive-index layer 18 was formed by using a mixture of $ZrO_2$ and $TiO_2$ (OH-5, made by Optron) as a film forming material, and each low-refractive-index layer 20 was formed by using $SiO_2$ as a film forming material.

Film forming was performed by vacuum deposition using an ordinary vacuum deposition apparatus with an oxygen introduction means added thereto. Film forming of silicon oxide film was performed by evacuating a film forming system (the interior of a vacuum chamber) to $8\times10^{-4}$ Pa, and by adjusting the pressure in the system to a film forming pressure of $7\times10^{-2}$ Pa by introducing oxygen into the system. The film thickness of silicon oxide film was controlled by selecting the film forming time on the basis of a film forming simulation performed in advance.

The optical components from which the results of testing shown in FIG. 2 were obtained are identical to each other except for the film thickness of the silicon oxide film.

The adhesion force of silicon oxide film 16 was evaluated by making a cellophane tape test. The adhesion force in the case where film separation was caused by one cellophane test was evaluated as adhesion force 1; the adhesion force in the case where film separation was caused by two or three cellophane tests was evaluated as adhesion force 2; and the adhesion force in the case where no film separation was caused even by four cellophane tests was evaluated as adhesion force 3. Also, the adhesion force in the case where a sample of adhesion force 3 and a sample of adhesion force 2 were both found was evaluated as adhesion force 2.5, and the adhesion force in the case where a sample of adhesion force 2 and a sample of adhesion force 1 were both found was evaluated as adhesion force 1.5.

As shown in FIG. 2, if the film thickness of the silicon oxide film (adhesion layer) formed by vacuum deposition using. SiO as a film forming material is larger, the adhesion property of light reflection preventing film 16 is better. In the illustrated example, the highest level 3 of adhesion force was evaluated when the film thickness was 300 nm or larger.

Thus, according to the first aspect of the present invention in which silicon oxide film 14 is used and the film thickness of silicon oxide film 14 is increased, an optical component in which the adhesion force of light reflection preventing film 16 is improved and which has improved durability can be realized.

As described above, in the optical component having substrate 12 made of a plastic and light reflection preventing film 16 formed on the substrate 12 in the first aspect of the present invention, an adhesion layer having an improved adhesion property to substrate 12 and having a large thickness is interposed between substrate 12 and light reflection preventing film 16 to ensure that the adhesion layer is highly effective in absorbing deformation of the substrate, thus realizing optical component 10 which has light reflection preventing film 16 having a strong adhesion force and which has improved durability. More specifically, a substrate made of an acrylic resin material such as PMMA is used as substrate 12 and silicon oxide film 14 is used as an adhesion layer.

In the optical component 10 in the first aspect of the present invention, there is no particular limit to the thickness of silicon oxide film 14 (adhesion layer), and the thickness may be set to such a selected value as to satisfy required characteristics with respect to use of optical component 10, required durability and optical characteristics, the material of the substrate, etc.

As described above, it is necessary to set the thickness of silicon oxide film 14 to a substantially large value in order that silicon oxide film 14 be advantageously effective in improving adhesion force between light reflection preventing film 16 and substrate 12 by absorbing deformation of substrate 12 due to heating/cooling by vacuum deposition, as well as in improving adhesion property to substrate 12. Also, according to a study made by the inventors of the present invention, thicker silicon oxide film 14 is basically advantageous in terms of adhesion.

Needless to say, the film thickness necessary for ensuring a sufficient adhesion force of light reflection preventing film 16 varies depending on characteristics of silicon oxide film 14 (adhesion layer). For example, the elasticity of silicon oxide film 14 varies depending on whether or not oxygen is introduced during film forming and on the amount of oxygen introduced. Therefore the necessary and suitable thickness varies from application to application.

On the other hand, the required adhesion force of light reflection preventing film 16 varies depending on its use and desired durability of optical component 10.

For example, referring to the example shown in FIG. 2, adhesion force of evaluated level 3 is not necessary in some uses of optical component 10. Therefore, a film thickness of 300 nm or more is not necessarily required in all cases.

From the viewpoint of optical characteristics, it is advantageous to reduce the thickness of silicon oxide film 14. If the thickness of silicon oxide film 14 is increased, the film forming time is also increased. This is disadvantageous in terms of productivity. Further, the rise in temperature of substrate 12 caused by heating becomes larger, so that the damage to substrate 12 is more serious. This tendency is stronger in the case of a multilayer film (multiple coating) such as that used in the present invention.

In other words, while thicker silicon oxide film 14 is used advantageously in terms of adhesion property in the optical component 10 of the present invention, the upper limit of the thickness of silicon oxide film 14 is necessarily determined according to required optical characteristics and heat resistance of the substrate.

That is, in the first aspect of the present invention, thick silicon oxide film 14 which functions as an adhesion layer is a silicon oxide film 14 having a thickness in such a range that the desired adhesion property can be achieved while considering optical characteristics required for optical component 10, damage to substrate 12 at the time of film forming, productivity, etc. The suitable thickness of silicon oxide film 14 may be determined according to the material of substrate 12, materials for forming light reflection preventing film 16, use of optical component 10, required durability and optical characteristics.

For example, in optical component 10 in the example shown in FIG. 2, the thickness of silicon oxide film 14 is preferably 100 nm to 800 nm and, more preferably, 300 nm to 600 nm.

Figure 3A:
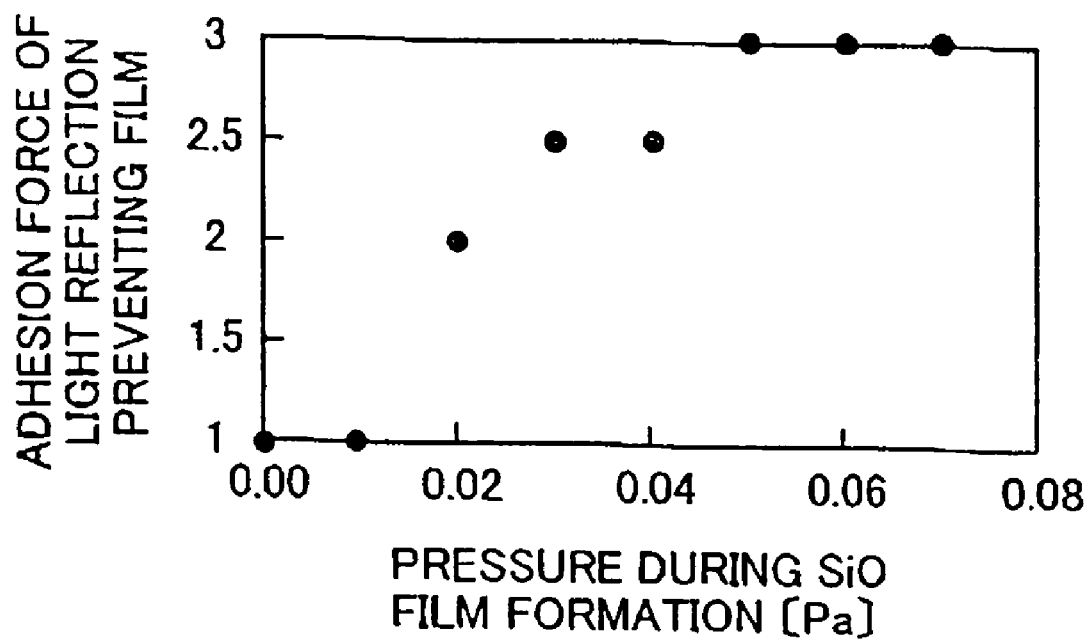
FIGS. 3A and 3B are graphs respectively showing the relationship between the pressure at the time of film forming of silicon dioxide film and the adhesion force of light reflection preventing film, and the relationship between the pressure and stress for explanation of optical components in accordance with the present invention.
Figure 3B:
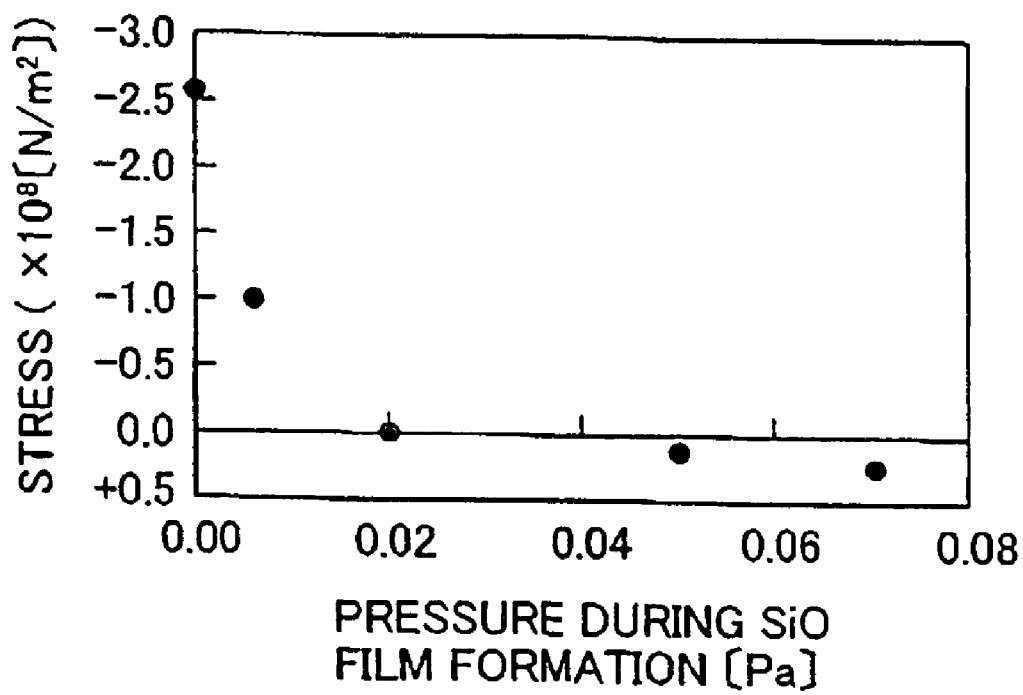

FIGS. 3A and 3B show results of film forming in the second aspect, i.e., the adhesion force (FIG. 3A) of light reflection preventing film 16 and stress (FIG. 3B) in silicon oxide film with respect to different amounts of oxygen introduced during film formation of silicon oxide film in optical components each of which has substrate 12, 400 nm thick silicon oxide film formed as an adhesion layer on a surface of substrate 12 by using SiO as a film forming material, and light reflection preventing film 16 formed on the silicon oxide film, and each of which is thus constructed in the same manner as the optical component shown in FIG. 1.

Film forming of light reflection preventing film 16 was performed so as to obtain the same layer structure, the same thickness of each layer and the same material forming each layer as those in the first aspect of the present invention described above.

Film forming was performed in the same manner as the above-described film forming in the first aspect of the present invention. Film forming of silicon oxide film was performed by evacuating a film forming system (the interior of a vacuum chamber) to $8 \times 10^{-4}$ Pa, and by adjusting the pressure in the system to a film forming pressure by introducing oxygen into the system. That is, if the film forming pressure is higher, the amount of introduced oxygen is larger. In the optical components from which the results of testing shown in FIG. 3 were obtained, film forming of each film (layer) in each optical component was performed under the same condition as that for the other optical components except for this control of the amount of introduced oxygen.

In FIGS. 3A and 3B, SiO film forming pressure=0 corresponds to the case where no oxygen is introduced.

The adhesion force of light reflection preventing film 16 was evaluated in the same manner as in the first aspect of the present invention.

Stress (internal stress) in the silicon oxide film was measured as described below. Silicon oxide film having a thickness of 400 nm was formed on a surface of a polyimide (film) substrate under the same condition as that for the above-described optical components, the amount of warpage of the substrate was measured, and stress in the film was calculated by the following equation (1):

$$k1 = [k4 \times (k2)^2 \times k6]/[3 \times (1-k5) \times k7 \times (k3)^2] \quad (1)$$

where k1 is stress per unit film thickness [N/m²] in silicon oxide film; k2 is the thickness [m] of the substrate; k3 is the length [m] of the substrate; k4 is the Yong's modulus [Pa] of the substrate; k5 is the Poisson's ratio of the substrate; k6 is the amount of warpage of the substrate [m]; and k7 is the thickness of the silicon oxide film [m].

As shown in FIGS. 3A and 3B, the adhesion property of light reflection preventing film 16 is stronger if the amount of oxygen introduced during film forming of silicon oxide film 14 using SiO as a film forming material is larger, and the absolute value of stress also becomes closer to zero if the amount of introduced oxygen is larger.

That is, oxygen is introduced during film forming of the silicon oxide film while controlling the amount of introduced oxygen to make silicon oxide film 14 porous and to impart a predetermined elasticity to the silicon oxide film 14, thereby realizing the desired adhesion property of light reflection preventing film 16.

In the optical component having substrate 12 made of a plastic and light reflection preventing film 16 formed on substrate 12 in the second aspect of the present invention, a flexible adhesion layer having better adhesion to substrate 12 and a predetermined elasticity is interposed between substrate 12 and light reflection preventing film 16, thereby realizing an optical component which has light reflection preventing film 16 with a strong adhesion force and providing the improved durability. More specifically, a substrate made of an acrylic resin material such as PMMA is used as substrate 12 and silicon oxide film 14 is used as the adhesion layer.

Presently, it is extremely difficult to directly measure the elasticity of a film formed by vacuum deposition, thus it is difficult to directly determine the elasticity. In the present invention, therefore, a predetermined elasticity of an adhesion layer, i.e., silicon oxide film 14, may be defined indirectly by using various characteristics due to porosity.

For example, in the example shown in FIG. 3B, a definition may be given such that when stress in silicon oxide film 14 is within a predetermined range (e.g., when the absolute value of the stress is equal to or larger than 0 and smaller than 0.5), this silicon oxide film 14 is assumed to have a predetermined elasticity. Also, in the example shown in FIG. 3A, a definition may be given such that when the adhesion force of light reflection preventing film 16 is stronger than a predetermined value (e.g., 2.5 or greater), this silicon oxide film 14 is assumed to have a predetermined elasticity. Further, another definition may be given such that when the above-described two conditions are satisfied, the silicon oxide film 14 is assumed to have a predetermined elasticity.

In the optical component 10 in the second aspect of the present invention, there is no particular limit to the thickness of silicon oxide film 14. However, if the film thickness of silicon oxide film 14 is excessively small, the effect of absorbing deformation of substrate 12 is not sufficient and the desired adhesion force of light reflection preventing film 16 cannot be obtained. Conversely, if the film thickness of silicon oxide film 14 is excessively large, it is disadvantageous in terms of optical characteristics of optical component 10, productivity, damage due to an increase in rise of the substrate temperature, etc.

Therefore the thickness of silicon oxide film 14 may be suitably determined according to the desired durability, optical characteristics, productivity, etc., in consideration of the above-described points. According to a study made by the inventors of the present invention, the thickness of silicon oxide film 14 is preferably 100 to 800 nm and, more preferably, 350 to 600 nm.

In the optical components 10 in the first and second aspects of the present invention, (multilayer) light reflection preventing film 16 is formed on silicon oxide film 14 which functions as the above-described adhesion layer.

In the illustrated example, the light reflection preventing film 16 has a four-layer structure in which two high-refractive-index layers 18 (18a and 18b) formed of a high-refractive-index material and two low-refractive-index layers 20 (20a and 20b) formed of a low-refractive-index material are alternately superposed one on another.

In the first and second aspects of the present invention, light reflection preventing film 16 is not limited to this structure. Any of well-known various multilayer (multiple coating) light reflection preventing films in which at least one high-refractive-index layer 18 and at least one low-refractive-index layer 20 are alternately formed can be used.

Thus, there is no particular restriction on the layer structure. For example, a light reflection preventing film having one high-refractive-index layer 18 and one low-refractive-index layer 20, or a light reflection preventing film having three high-refractive-index layers 18 and three low-refractive-index layers 20 may be used.

Also, there is no particular restriction on the selection of materials for forming high-refractive-index layer 18 and low-refractive-index layer 20. Any of materials for forming various multilayer light reflection preventing films can be used. For example, high-refractive-index layer 18 is a layer formed by using $ZrO_2$ as a film forming material, a layer formed by using $TiO_2$ as a film forming material, a layer formed by using a mixture material of $ZrO_2$ and $TiO_2$ such as the above-mentioned OH-5 as a film forming material, a layer formed by using $Y_2O_3$ as a film forming material, a layer formed by using $CeO_2$ as a film forming material, or a layer formed by using $Ta_2O_5$ as a film forming material. Low-refractive-index layer 20 is, for example, a layer formed by using $SiO_2$ as a film forming material, a layer formed by using $MgF_2$ as a film forming material, or a layer formed by using $CaF_2$ as a film forming material.

Also, there is no particular limitation to the thickness of each layer constituting the light reflection preventing film. The thickness may be suitably determined according to the forming materials, layer structure, required optical characteristics, etc.

In manufacture of the above-described optical component 10 in the first aspect of the present invention, a well-known process such as vacuum deposition may be performed to form each of silicon oxide film 14 and light reflection preventing film 16. If silicon oxide film 14 is made porous in its preferred aspect as described above, vacuum deposition may be performed while introducing oxygen as in the second aspect.

On the other hand, in manufacture of the above-described optical component 10 in the second aspect of the present invention, any of well-known film forming processes may be performed to form each of silicon oxide film 14 and light reflection preventing film 16 while vacuum deposition accompanied by introduction of oxygen is performed for film forming of silicon oxide film 14 as described above. Therefore, if the productivity is considered, ordinary vacuum deposition may be performed for film forming of light reflection preventing film 16.

In the first and second aspects, resistance heating or electron beam heating may be used for film forming. Preferably, film forming of silicon oxide film 14 is gently performed at a comparatively slow film forming speed by using resistance heating. Also, preferably, heating energy is limited to 400 A or less. If film forming of silicon oxide film 14 is performed in this manner, elasticity for more preferably flexibility can be imparted to silicon oxide film 14, and the rise in temperature of the substrate during film forming for comparatively thick silicon oxide film 14 can be reduced.

In film forming by vacuum deposition, so-called splash, i.e., bumping of a film forming material during film forming, may occur depending on factors including characteristics of the film forming material, resulting in deterioration in properties of the film, etc. to reduce an yield. To avoid this drawback in a case where a film forming material liable to have bumping is used, melting, i.e., temporarily melting the film forming material in the hearth before film forming, is performed. In particular, the film forming material for high-refractive-index layer 18 often needs melting.

Ordinarily, melting of a film forming material is performed before film forming. According to a study made by the inventors of the present invention, however, a film forming material for light reflection preventing film is attached to substrate 12 if melting of the film forming material is performed, and the attached film forming material becomes a cause of a deterioration in adhesion property of the adhesion layer, i.e., silicon oxide film 14. In manufacture of each of the optical components 10 in the first and second aspects of the present invention, therefore, it is preferable to perform melting of a film forming material after film forming of silicon oxide film 14.

The optical components and the methods of manufacturing the optical components in the third and fourth aspects of the present invention will be described.

The optical components in the third and fourth aspects of the present invention also have the layer structure shown in FIG. 1, as the optical components in the first and second aspects of the present invention. As described below with reference to the optical component 10 shown in FIG. 1, the optical component in the third aspect of the present invention is characterized in that the directions of internal stresses in two adjacent films in multilayer light reflection preventing film 16 are different from each other, and the optical component in the fourth aspect of the present invention is characterized in that the film thickness of an impurity on a surface of substrate 12, i.e., between substrate 12 and silicon oxide film 14, is 0.2 nm or less. The description will be made mainly of characteristic details of each of the optical components in the third and fourth aspects, and description of identical details of the optical components will be made in common. However, the detailed description for portions corresponding to the same constructions of those in the above-described optical component in the first or second aspect of the present invention will not be repeated.

Also in the third and fourth aspects of the present invention, there is no restriction on the selection of substrate 12 (i.e., the main body (kind) of optical component 10) in the present invention, and any of various known optical components can be used, as in the first and second aspects of the present invention.

Also, there is no particular restriction on the selection of the material for forming substrate 12 except that the material must be selected from resin materials. Any of plastics (resin materials) for optical components can be used. For example, polymethyl methacrylate (PMMA), polycarbonate (PC), polyolefin, polyvinyl chloride, or polystyrene is preferably used. Other than the above-described materials, polymer film such as polyester film, polyetherimide film, polyallylate film, or polyether sulfin film is preferably used.

Base substrate 12 made of an acrylic material, particularly PMMA is preferred among such materials from the viewpoint of the effect of improving adhesion force of silicon oxide film 14 (first layer) to be described below.

The illustrated example of optical component 10 has a silicon oxide film 14 which is formed on such a substrate 12 to function as an adhesion layer, on which a light reflection preventing film 16 constituted by four layers: a high-refractive-index layer 18a, a low-refractive-index layer 20a, a high-refractive-index layer 18b, and a low-refractive-index layer 20b.

In the optical component 10 in the third aspect of the present invention, each adjacent pair of these layers (films) have stresses in different directions. In the illustrated example, combinations of layers where this relationship is realized are, for example, a silicon oxide film 14, a high-refractive-index layer 18, and a low-refractive-index layer 20 each of which is formed by vacuum deposition, SiO being used as a film forming material for silicon oxide film 14, a mixture of $ZrO_2$ and $TiO_2$ (OH-5, made by Optron) being used as a film forming material for high-refractive-index layer 18, and $SiO_2$ being used as a film forming material for low-refractive-index layer 20.

As described above, when a multilayer light reflection preventing film is formed on a substrate made of a plastic, the multilayer light reflection preventing film is damaged and strained by a large amount of shrinkage/deformation of the substrate caused by cooling after film forming. In the case of forming a multilayer light reflection preventing film, the problem is more serious since a plurality of films are successively formed, as described above.

As a result, the adhesion force of the multilayer light reflection preventing film is reduced. Also, the adhesion force gradually reduces with time. In particular, conventional optical components having a multilayer light reflection preventing film do not have suitable characteristics according to requirements in terms of durability, as described above.

The inventors of the present invention, with a view to solving this problem, have eagerly studied to find as a cause of a reduction in adhesion force of light reflection preventing film, the fact that stresses in different layers synergize with each other to reduce the adhesion force of the light reflection preventing film.

In a thin film formed by vapor-phase deposition such as vacuum deposition, stress exists due to, for example, a structural change in the material caused during film forming (internal stress in thin film). This stress is caused as a force such as to bend the substrate on which the film is formed. Also, this stress includes two kinds of stress: compressive stress to be bent such that the center of the film is displaced away from the substrate (curving inwardly to the substrate); and tensile stress to be bent such that ends of the film are displaced away from the substrate (curving outwardly from the substrate).

Such stress can of course appear as a force to separate the film and act as a cause of a reduction in adhesion force. If in an optical component having a multilayer light reflection preventing film, the directions of stresses in the layers forming the film coincide with each other, directions of forces applied to the layers for separating the film coincide with each other. Thus, the adhesion force is considerably reduced by the synergetic effect of the stresses in the layers, resulting in reduction in adhesion force of the multilayer light reflection preventing film and insufficient durability of the optical component.

In contrast, in the optical component part 10 of the present invention in which the directions of stresses in each adjacent pair of layers (films) are different from each other; the stresses in the adjacent layers cancel each other out and the stresses in the films formed on the substrate, on the whole, can be reduced to substantially zero. Thus, the reduction in adhesion force of light reflection preventing film 16 due to stress in the film can be limited to an advantageously small amount to ensure that the optical component 10 can have improved durability.

Such film stress can be determined, for example, in such a manner that a thin film is formed on a substrate, the amount of warpage of the substrate is measured and stress is calculated by the equation (1) shown above. In the equation (1) shown below, k1 represents stress per unit film thickness [N/m$^2$] and k7 represents the thickness of the film [m].

$$k1 = [k4 \times (k2)^2 \times k6]/[3 \times (1-k5) \times k7 \times (k3)^2] \quad (1)$$

The film has tensile stress if this k1 (film stress) is positive. Conversely, the film has compressive stress if this k1 (film stress) is negative.

Figure 4:
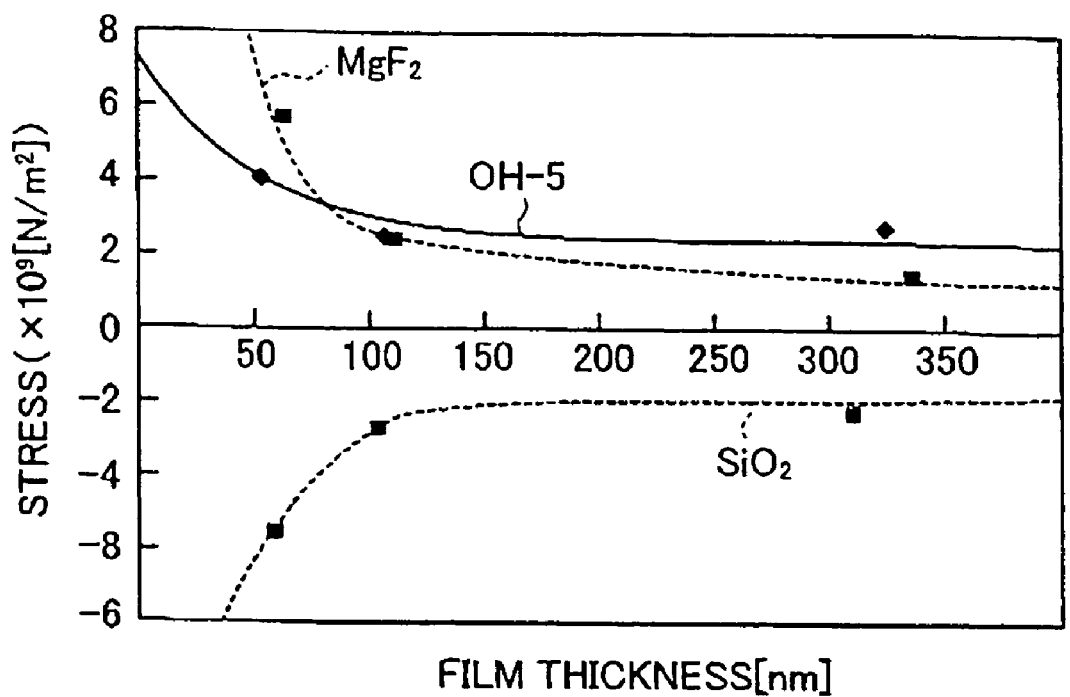
FIG. 4 is a graph showing stresses in various vacuum-deposited films for explanation of optical components in accordance with the present invention.

FIG. 4 shows stresses in films which are formed using OH-5, SiO$_2$ and MgF$_2$ as film forming materials on substrates made of polyimide film by vacuum deposition.

As shown in FIG. 4, films formed by using OH-5 and MgF$_2$ as film forming materials have tensile stress, while a film formed by using SiO$_2$ as a film forming material has compressive stress. Also, a film formed by vacuum deposition using SiO as a film forming material compressive stress whether or not introducing oxygen during film forming described below.

It can therefore be understood that the optical component 10 in the illustrated example, which has the above-described construction such that SiO is used as a film forming material for silicon oxide film 14, OH-5 is used as a film forming material for high-refractive-index film 18, and SiO$_2$ is used as a film forming material for low-refractive-index film 20, has stresses in the respective layers suitably cancelled so that the reduction in adhesion force of light reflection preventing film 16 due to the stresses is limited to a small amount, and therefore has improved durability.

On the other hand, in the optical component 10 in the fourth aspect of the present invention, the film thickness of an impurity (the thickness in the direction in which the films (layers) are successively superposed) existing on the surface of substrate 12 is 0.2 nm or less.

That is, in the optical component 10 in the illustrated example, the film thickness of an impurity other than silicon oxide film 14 existing between substrate 12 and silicon oxide film 14, more specifically, the thickness of the same material as that of high-refractive-index layer 18 existing between substrate 12 and silicon oxide film 14 is 0.2 nm or less.

As described above, when a multilayer light reflection preventing film is formed on a substrate made of a plastic, the multilayer light reflection preventing film is damaged and strained by a large amount of shrinkage/deformation of the substrate caused by cooling after film forming. Also as described above, the problem is more serious since a plurality of films are successively formed in forming a multilayer light reflection preventing film.

As a result, the adhesion force of the multilayer light reflection preventing film is reduced. Also, the adhesion force gradually reduces with time. In particular, conventional optical components having a multilayer light reflection preventing film do not have required characteristics in terms of durability, as described above.

The inventors of the present invention, with a view to solving this problem, have eagerly studied and found the fact that vapor of a material generated at the time of melting is attached/deposited on the surface of substrate 12 to cause reduction in adhesion force of the film formed on the substrate surface (hereinafter referred to as the first layer) if the attached/deposited material differs from that of the first layer, and that this material acts to further reduce the adhesion force of the multilayer light reflection preventing film, etc., in synergy with strain or the like caused by the above-described deformation.

In film forming by vacuum deposition, bumping of a film forming material during film forming may occur as so-called splash or the like, depending on factors including characteristics of the film forming material. If splashes caused in such a phenomenon are mixed in the film, a defective product in which deterioration in properties of the film, etc., are caused results, thus reducing yield.

To avoid this drawback in a case where a film forming material liable to have bumping is used, melting, i.e., temporarily melting the film forming material in the hearth before film forming, is performed. In particular, a high-refractive-index material such as that for forming high-refractive-index layer 18 in (multilayer) light reflection preventing film 16 in the illustrated example often needs melting.

Melting is performed as described below. A film forming substrate, a film forming material, etc., are set at predetermined positions in a vacuum vapor deposition apparatus ((vacuum) chamber). After this setting is made, to initiate film forming, melting is performed by melting the film forming material under the conditions equivalent to those for film forming (with respect to the degree of vacuum and heating energy) while a shutter for shutting off vapor from an evaporation source (film forming material) is closed. Or, in many cases, melting is performed by setting such conditions that the material can evaporate more easily during melting than during film forming in order to remove impurities mixed in a film forming material. In such a case, a substantial amount of the film forming material evaporates during melting.

Even when the shutter is closed, vapor of the film forming material diffuses by passing the shutter in a roundabout fashion since the shutter ordinarily does not completely isolate from each other the space in which the evaporation source exists and the space in which the substrate exists. Thus, the vapor of film forming material fills the chamber, reaches the film forming substrate, and is attached to and deposited on the substrate surface. That is, if melting is performed in the ordinary vacuum deposition film forming process, deposition of the film forming material on the substrate surface cannot be prevented.

If a material to be melt is the first layer film forming material, there is no problem since the material depositing on the substrate surface is the same as that of the first layer.

However, in a case where a material to be melt is a material for forming a layer other than the first layer, the material depositing on the surface of substrate 12 differs from the material of the first layer, that is, becomes an impurity. This impurity acts as a contaminant on the substrate surface to impede adhesion of the first layer formed after melting, thus reducing the adhesion force of the first layer. Since melting of the film forming material for highrefractive-index material 18 is ordinarily performed in the illustrated example as described above, this material deposits on the surface of substrate 12 to impede adhesion of silicon oxide film 14 forming the first layer. Needless to say, the same problem is encountered when melting of the film forming material for low-refractive-index material 20 is performed.

As described above, attachment/deposition of vapor on the substrate surface at the time of melting is unavoidable in the ordinary vacuum deposition film forming process. That is, when melting of a material other than the first-layer film forming material is performed, deposition of the impurity is unavoidable. Also, the impurity deposits on the surface of substrate 12 under various conditions, e.g. in a layer form covering the entire surface of the substrate, in spot form, in stripe form or the like, depending on the structures of the chamber and the shutter, characteristics of the film forming material, etc.

According to a study made by the inventors of the present invention, however, the adverse influence of the impurity can be avoided substantially completely if the film thickness of the impurity is 0.2 nm or less, regardless of the state of attachment of the impurity to the substrate surface. That is, according to the present invention in which the film thickness of an impurity on the substrate surface is limited to 0.2 nm or less, impediment to adhesion of the first layer is prevented to ensure sufficiently strong adhesion force of the first layer, thus realizing optical component 10 having improved durability.

A method for setting the film thickness of an impurity on the surface of substrate 12 in the optical component 10 to 0.2 nm or less in the fourth aspect of the present invention is not particularly specified. Any of various possible methods may be used.

For example, diffusion of film forming material vapor at the time of melting, the state of attachment of the material from the vapor to the surface of substrate 12, and the amount of attachment of the material are generally influenced by the shape of the chamber, the shape and size of the shutter, or the like; a method by suitably setting or adjusting these factors so as to reduce the amount of attachment to the substrate surface to limit the thickness to 0.2 nm or less may be used. It is also possible to obtain similar effects by suitably setting melting conditions.

As described above, in the embodiments of optical components 10 in the third and fourth aspects of the present invention, silicon oxide film 14 is formed on the surface of substrate 12.

In these aspects, silicon oxide film 14 is a film which is provided in a preferred aspect, which functions as an adhesion layer for improving adhesion force between substrate 12 and light reflection preventing film 16, and which is a film formed by vacuum deposition using silicon monoxide (SiO) as a film forming material, as described above as a more preferable aspect in the illustrated example.

Also, in the embodiments in the above-described aspects, silicon oxide film 14 in a further preferable aspect is formed in such a manner that oxygen is introduced into the film forming system during film forming to impart elasticity for flexibility to the film. In other respects, film forming of silicon oxide film 14 may be performed in the same manner as ordinary vacuum deposition.

Silicon oxide film 14 formed by vacuum deposition using SiO as a film forming material has superior adhesion property to a plastic, particularly PMMA. Also, this silicon oxide film 14 can be made porous by introducing oxygen into the film forming system during film forming. Elasticity for flexibility can also be imparted to silicon oxide film 14 according to the amount of oxygen introduced. Moreover, stress (internal stress in thin film) can be reduced by oxygen introduction during film forming.

Therefore, if such silicon oxide film 14 is provided, deformation (expansion/shrinkage) of substrate 12 during film forming of light reflection preventing film 16 by vacuum deposition can be absorbed to prevent light reflection preventing film 16 from being damaged and strained by such deformation, and to prevent a reduction in adhesion force of light reflection preventing film 16 due to such damage and strain, thus making it possible to realize optical component 10 having improved durability.

Further, in the optical component 10 in the fourth aspect of the present invention, the thickness of an impurity attached to the surface of substrate 12 is 0.2 nm or less, as described above. Therefore adhesion force of silicon oxide film 14 is sufficient.

Also in the optical components 10 in the third and fourth aspects of the present invention, there is no particular limit to the film thickness of silicon oxide film 14. The thickness of silicon oxide film 14 may be suitably determined according to the desired durability, optical characteristics, productivity, etc., in consideration of the above-described points, as is that in the optical component 10 in the second aspect of the present invention. For example, the thickness of silicon oxide film 14 is preferably 100 to 800 nm and, more preferably, 350 to 600 nm.

Also in the optical components 10 in these aspects, (multilayer) light reflection preventing film 16 is formed on silicon oxide film 14 functioning as the above-described adhesion layer.

As described above, the light reflection preventing film 16 has a four-layer structure in which two high-refractive-index layers 18 (18a and 18b) formed of a high-refractive-index material and two low-refractive-index layers 20 (20a and 20b) formed of a low-refractive-index material are alternately superposed one on another.

In the optical component 10 in the third aspect of the present invention, silicon oxide film 14 is a layer having compressive stress, high-refractive-index layer 18 in light reflection preventing film 16 is formed of a high-refractive-index material, e.g., OH-5, and low-refractive-index layer 20 in light reflection preventing film 16) is formed of a low-refractive-index material, e.g., SiO$_2$. High-refractive-index layer 18 has tensile stress, and low-refractive-index layer 20 has compressive stress, as shown in FIG. 4.

In the optical component 10 in the illustrated example, therefore, the directions of stresses in each adjacent pair of layers differ from each other, so that the stresses therein cancel out each other. That is, a reduction in the adhesion force of light reflection preventing film 16 due to stresses in films is prevented, so that the durability of the optical component is high.

Also in the third and fourth aspects of the present invention, light reflection preventing film 16 is not limited to that described above, and any of well-known various multilayer (multiple coating) light reflection preventing films in which at least one high-refractive-index layer 18 and at least one low-refractive-index layer 20 are alternately formed can be used, as in the first and second aspects.

In the optical components 10 in the third aspect of the present invention, it is necessary that the directions of stresses in each adjacent pair of layers differ from each other. Any multilayer light reflection preventing film may be formed as long as the directions of stresses in each adjacent pair of layers differ from each other.

Also in the third and fourth aspects of the present invention, there is no particular restriction on the selection of the materials for forming high-refractive-index layer 18 and low-refractive-index layer 20, and any of materials for forming various multilayer light reflection preventing films can be used, as in the first and second aspects.

In the optical component 10 in the third aspect of the present invention, the directions and/or magnitudes of stresses in various films may be measured in advance and selections may be made therefrom such that the directions of stresses in each adjacent pair of layers differ from each other and, more particularly, such that the stresses can suitably cancel out each other.

Also in the third and fourth aspects of the present invention, there is no particular limit to the thickness of each layer constituting light reflection preventing film 16, and the thickness may be suitably determined according to the materials of the layers, the layer structure, required optical characteristics, etc., as in the first and second aspects.

In the optical components 10 in the third aspect of the present invention, stress in the film becomes larger if the film thickness is increased. Therefore the thicknesses of the layers (including silicon oxide film 14) may be set by considering cancellation of the stresses therein, if required optical characteristic are satisfied.

In the third and fourth aspects of the present invention, the present invention is not limited to the optical component having such multilayer light reflection preventing film. The present invention can be applied to any of optical components having other various constructions, e.g., an optical component having a single-layer light reflection preventing film if the optical component has a substrate made of a plastic and has a plurality of films. The present invention can be applied to other optical components having no light reflection preventing film. Further, the adhesion layer is not necessarily required.

Basically, the optical components 10 in the third aspect of the present invention can be manufactured by ordinary vacuum deposition. Also, basically, the optical components 10 in the fourth aspect of the present invention can be manufactured by ordinary vacuum deposition if attachment of an impurity to substrate 12 at the time of melting is sufficiently taken into account, as described above.

That is, in manufacture of the optical components 10 in the third and fourth aspects of the present invention, any of well-known vacuum deposition may also be performed to form each of silicon oxide film 14 and light reflection preventing film 16 while vacuum deposition accompanied by introduction of oxygen is performed for film forming of silicon oxide film 14, as in the second aspect. Also, the same heating method and heating conditions for film forming as those in the second aspect may be used. As a result, elasticity for more preferable flexibility can also be imparted to silicon oxide film 14, and it is possible to reduce the rise in temperature of the substrate during film forming of comparatively thick silicon oxide film 14.

In manufacture of the optical components 10 in the third aspect of the present invention, it is preferable to perform melting of film forming materials after film forming of silicon oxide film 14, as in the first and second aspects.

While film forming is performed by vacuum deposition in the above-described examples of the manufacturing process, the third aspect of the present invention can be applied to any optical component having films formed by vacuum deposition. For example, the invention may be applied to optical components manufactured by performing film forming by sputtering or chemical vapor deposition (CVD).

In the fourth aspect of the present invention, melting of a film forming material is performed as required when film forming is performed by vacuum deposition, as described above. Here, preferably, in a case where melting is performed, the optical component in accordance with the present invention in which the thickness of an impurity on the substrate surface is limited to 0.2 nm or less is manufactured by a manufacturing method in which melting of a material other than the first-layer film forming material is performed after film forming of the first layer.

That is, in manufacture of the optical component 10 in the illustrated example, if melting of the film forming material for high-refractive-index layer 18 for example is performed, silicon oxide film 14 is formed as the first layer on the surface of substrate 12, melting of the film forming material for high-refractive-index layer 18 is then performed, and film forming is thereafter performed in the order of high-refractive-index layer 18a→low-refractive-index layer 20a→high-refractive-index layer 18b→low-refractive-index layer 20b.

Presently, in a film forming process for manufacturing an optical component having a plurality of films by performing vacuum deposition, a substrate and a film forming material are set in a vacuum deposition apparatus, melting of the film forming material is first performed before film forming, and film forming steps for a plurality of layers are thereafter performed successively. This process is considered to have high film forming efficiency as well as sufficient productivity.

Therefore, if melting of a film forming material other than the first-layer film forming material is performed, attachment of an impurity to the surface of substrate 12 is unavoidable. However, it is possible to limit the film thickness of the impurity on the substrate surface to 0.2 nm or less by suitably selecting the size and shape of the shutter, the shape of chamber, melting conditions, etc., so as to reduce the amount of the impurity attached to the substrate surface as described above.

In quite a number of cases, however, it is necessary to increase the size of the shutter, and to form the shutter in a complicated shape in order to positively limit diffusion of vapor at the time of melting. A problem then arises that the equipment cost is disadvantageously high. Changes in equipment including the shutter, i.e., equipment about the evaporation source, a change in shape of the chamber, etc., lead to a change in the diffusing condition of vapor during vacuum deposition. That is, there is a possibility of the film forming conditions being changed. Therefore such changes should generally be avoided.

Further, diffusion of vapor at the time of melting varies depending on characteristics of film forming materials. Here, an ordinary vacuum deposition apparatus is typically arranged not for use of only one film forming material but for use of a variety of film forming materials. Therefore, even if diffusion of vapor of one film forming material can be effectively limited, it is highly possible that a large amount of an impurity produced from a different film forming material may deposit on the substrate surface through diffusion of vapor.

Also, evaporation of a film forming material is unavoidable if the system is arranged to perform melting practically effectively. Further, in a case where attachment of an impurity by evaporation is prevented by selecting melting conditions, an excessive increase in melting time occurs, for example. Thus, various drawbacks are encountered.

In contrast, according to the manufacturing method in which melting of a material other than the first-layer film forming material is performed after film forming of the first layer, it is possible to prevent deposition of impurities on the substrate surface due to melting in accordance with any film forming material without requiring changing the shutter configuration, setting for melting conditions, etc. This method can be used particularly advantageously for manufacture of a product, such as optical component 10 having (multilayer) light reflection preventing film 16, in which quality including film adhesion force is important since it ensures to completely prevent deposition of impurities on the substrate surface due to melting.

Then, in an ordinary vacuum deposition film forming process, a plurality of layers are successively formed after melting so as to be completed efficiently, as described above.

On the other hand, in this manufacturing method, melting is performed after film forming on the substrate surface, and thereafter film forming of other films is performed. This manufacturing method is rather disadvantageous in terms of film forming time and film forming operation efficiency in comparison with the ordinary film forming process. According to this method, however, it is possible to completely prevent attachment of impurities to the substrate surface and to thereby eliminate the possibility of impediment to adhesion by impurities. Occurrence of defectives due to a reduction in adhesion caused by impurities is thereby eliminated to largely increase the yield.

Thus, according to this manufacturing method, the productivity and production efficiency can be improved on the whole, and a reduction in manufacturing cost can be achieved by increasing the yield.

Precipitation of an impurity on the substrate surface caused by melting can also be prevented by a method in which melting is first performed, the substrate is then set in the vacuum deposition apparatus and a plurality of layers are successively formed. This method, however, requires opening of the chamber to atmosphere after melting and is therefore disadvantageous in terms of efficiency.

Various embodiments of the optical component and the method of manufacturing the optical component according to the present invention have been described in detail. However, needless to say, the present invention is not limited to those various embodiments described above, and various modifications and changes may be made in the described embodiments without departing from the gist and scope of the invention.

EXAMPLES

The present invention will be described in more detail with respect to examples thereof.

Example 1

Figure 5:
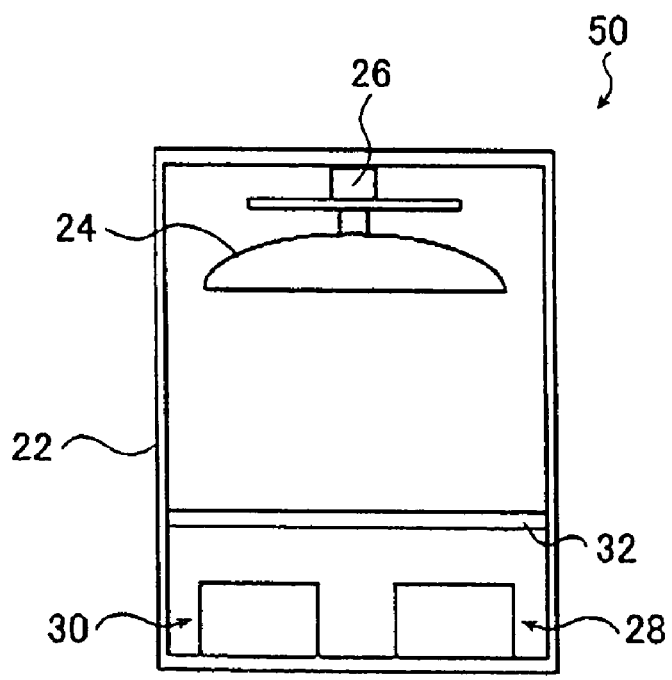
FIG. 5 is a diagram schematically showing an example of a vacuum deposition apparatus used in an embodiment of the present invention.

An optical component 10 shown in FIG. 1 was manufactured by using a commercial vacuum deposition apparatus 50 (hereinafter referred to as "deposition apparatus") as schematically shown in FIG. 5, and an oxygen introduction means added to the deposition apparatus 50. This deposition apparatus 50 has an electron gun evaporation source 28 which is provided as a means for heating a material to be evaporated, and which performs heating using an electron beam, and a resistance heating evaporation source 30 which is provided as a means for heating a material to be evaporated by resistance heating, and which performs resistance heating.

First, a lens made of PMMA (VH001, made by Mitsubishi Rayon Co., Ltd.) was set as substrate 12 in a rotary dome 24 in a vacuum chamber 22 of the deposition apparatus 50. This rotary dome 2.4 is rotated at a predetermined speed by a rotating means 26.

Subsequently, SiO as a film forming material for silicon oxide film 14 was set at a predetermined position (in a hearth) in the resistance heating evaporation source 30. Also, OH-5 (a mixture of $ZrO_2$ and $TiO_2$, made by Optron) as a film forming material for high-refractive-index layer 18 and $SiO_2$ as a film forming material for low-refractive-index layer 20 were respectively set at predetermined positions (in hearths) in the electron gun evaporation source 28.

The vacuum chamber (hereinafter referred to as "chamber") 22 was closed and was then evacuated. When the pressure in the chamber 22 became equal to $8\times10^{-4}$ Pa, oxygen was introduced into the chamber 22 and the pressure in the chamber 22 was adjusted to 0.05 Pa. A shutter 32 was then opened, and a resistance heating means in the resistance heating evaporation source 30 was driven to heat the hearth filled with SiO. Film forming of silicon oxide film 14 having a thickness of about 400 nm was performed at a film forming pressure of 0.05 Pa.

The resistance heating means in the resistance heating evaporation source 30 has a 6 kW resistance heating electrode. Power was supplied at 350 A to this electrode to heat SiO by resistance heating, thereby performing film forming.

After the completion of film forming of silicon oxide film 14, the shutter 32 was closed. When the pressure in the chamber 22 became equal to $1\times10^{-3}$, the electron gun in the electron gun evaporation source 28 was driven with an output of 250 mA to irradiate the hearth containing OH-5 with an electron beam. The hearth was scanned with the electron beam, thereby performing melting of OH-5.

After melting, when the pressure in the chamber 22 increased by melting became $1\times10^{-3}$ Pa, the shutter 32 was opened and the electron gun in the electron gun evaporation source 28 was driven with an output of 230 mA to irradiate OH-5 in the hearth with the electron beam, thereby forming high-refractive-index layer 18a having a thickness of about 20 nm on silicon oxide film 14. The film forming pressure was maintained at $8\times10^{-3}$ Pa.

When the pressure in the chamber 22 increased during film forming became $1\times10^{-3}$ Pa after film forming of high-refractive-index layer 18a, the hearth in the electron gun evaporation source 28 was changed, $SiO_2$ in the hearth was irradiated with the electron beam at an output of 85 mA from the electron gun to form low-refractive-index layer 20a having a thickness of about 30 nm on high-refractive-index layer 18a. The film forming pressure was maintained at $1\times10^{-3}$ Pa.

When the pressure in the chamber 22 increased during film forming became $1\times10^{-3}$ Pa after film forming of low-refractive-index layer 20a, the hearth in the electron gun evaporation source 28 was changed, OH-5 in the hearth was irradiated with the electron beam at an output of 230 mA from the electron gun to form high-refractive-index layer 18b having a thickness of about 100 nm on low-refractive-index layer 20a. The film forming pressure was maintained at $8\times10^{-3}$ Pa.

When the pressure in the chamber 22 increased during film forming became $1\times10^{-3}$ Pa after film forming of high-refractive-index layer 18b, the hearth in the electron gun evaporation source 28 was changed, $SiO_2$ in the hearth was irradiated with the electron beam at an output of 85 mA from the electron gun to form low-refractive-index layer 20b having a thickness of about 90 nm on high-refractive-index layer 18b, thereby fabricating optical component 10 of the present invention having light reflection preventing film 16.

The film forming pressure for forming low-refractive-index layer 20b was maintained at $1\times10^{-3}$ Pa, as in the former case.

The temperature of substrate 12 from the start of film forming of silicon oxide film 14 to the completion of film forming of light reflection preventing film 16 (low-refractive-index layer 20b) was in the range from room temperature to 80° C. Oxygen was introduced only during film forming of silicon oxide film 14.

The thickness of each film was set by using a design value obtained by optical simulation software to obtain desired optical characteristics. The film thickness of each film (layer) was controlled by adjusting the film forming time on the basis of the results of a film forming simulation performed in advance.

Comparative Example 1

An optical component was fabricated in the same manner as Example 1 except that the film thickness of silicon oxide film 14 was set to 50 nm.

Comparative Example 2

An optical component was fabricated in the same manner as Example 1 except that oxygen was not introduced at the time of film forming of silicon oxide film 14.

The film forming pressure when silicon oxide film 14 was formed was controlled at $1\times10^{-3}$ Pa.

Comparative Example 3

An optical component was fabricated in the same manner as Example 1 except that $MgF_2$ was used as a film forming material for forming a low-refractive-index layer.

Melting of $MgF_2$ was performed under conditions of a degree of vacuum of $8\times10^{-4}$ Pa and an electron gun output of 90 mA. Film forming of $MgF_2$ was performed under conditions of a film forming pressure of $8\times10^{-4}$ Pa and an electron gun output of 55 mA. The film thicknesses of the low-refractive-index layers are the same as those in Example 1.

Comparative Example 4

An optical component was fabricated in the same manner as Example 1 except that melting of OH-5 as a film forming material for high-refractive-index layer 18 was performed before film forming of silicon oxide film 14.

The adhesion of light reflection preventing film 16 in each of the optical component 10 obtained as Example 1 and the optical components obtained as Comparative Examples 1 to 4 was tested. All optical components obtained from the Example 1 and the Comparative Examples 1 to 4 exhibited good and satisfactory optical characteristics.

An adhesion test was performed as described below. Thirty components were randomly selected from one batch (600 components) of the fabricated optical components. A cellophane tape (No. 405, made by Nichiban Co., Ltd.) was firmly adhered to the surface of each selected component and then peeled off instantly in a direction perpendicular to the film surface. Peeling of the film was visually confirmed.

A sample group in which peeling of the film was not recognized in all the selected optical components was evaluated as ○. A sample group in which there was at least one optical component that experienced partial peeling of the film was evaluated as Δ. A sample group in which there was at least one optical component that experienced almost complete peeling of the film was evaluated as x. A sample group in which no peeling of the film was recognized in all the optical components even after the same test was repeated 10 times was remarkably evaluated as ⊙.

The result is, that the optical components 10 of the present invention were evaluated as ⊙, while those of all Comparative Examples 1 to 4 were evaluated as x. Moreover, in the optical components in Comparative Examples 1 to 4, complete peeling was recognized on all the 30 samples.

From the above-described results, the effect of the present invention is apparent.

According to the first and second aspects of the present invention, as described above in detail, an optical component having a multilayer light reflection preventing film including a high-refractive-index layer and a low-refractive-index layer alternately formed on a substrate can realize an optical component in which the adhesion force of the multilayer light reflection preventing film is high, and which therefore has improved durability.

According to the third and fourth aspects of the present invention, as described above in detail, an optical component having a multilayer light reflection preventing film formed on a substrate by vacuum deposition can realize an optical component in which the adhesion force of film (layer) formed on the surface of member surface of substrate is high, and which therefore has improved durability.

What is claimed is:

1. A method of manufacturing an optical component which comprises:
   a substrate made of a resin material;
   a silicon oxide film formed on a surface of said substrate; and
   a multilayer light reflection preventing film formed on said silicon oxide film, and having at least one layer of a low-refractive-index material and at least one layer of a high-refractive-index material being alternately formed, comprising:
   forming said silicon oxide film by vacuum deposition; and
   introducing oxygen during film forming of said silicon oxide film by vacuum deposition to impart a preset elasticity to said silicon oxide film.

2. The method of manufacturing an optical component according to claim 1, wherein said substrate is made of an acrylic resin material.

3. A method of manufacturing an optical component in which a plurality of films are formed by vacuum deposition on a surface of a substrate made of a resin material, said method comprising:
   forming one film of said plurality of films on the surface of said substrate; and
   performing melting of film forming materials other than a film forming material for said one film formed on the surface of said substrate after film forming of said one film of said plurality of films on the surface of said substrate.

* * * * *